United States Patent
Lahalih

(10) Patent No.: US 9,518,208 B2
(45) Date of Patent: Dec. 13, 2016

(54) GELLING AGENT FOR WATER SHUT-OFF IN OIL AND GAS WELLS

(71) Applicant: KUWAIT INSTITUTE FOR SCIENTIFIC RESEARCH, Safat (KW)

(72) Inventor: Shawqui M. Lahalih, Safat (KW)

(*) Notice: Subject to any disclaimer, the term of this patent is extended or adjusted under 35 U.S.C. 154(b) by 0 days.

(21) Appl. No.: 14/658,536

(22) Filed: Mar. 16, 2015

(65) Prior Publication Data

US 2016/0068738 A1 Mar. 10, 2016

Related U.S. Application Data

(62) Division of application No. 14/483,068, filed on Sep. 10, 2014, now Pat. No. 9,074,125.

(51) Int. Cl.
| | | |
|---|---|---|
| *E21B 43/00* | (2006.01) | |
| *E21B 33/00* | (2006.01) | |
| *E21B 43/26* | (2006.01) | |
| *C09K 8/42* | (2006.01) | |
| *C09K 8/88* | (2006.01) | |
| *C09K 8/508* | (2006.01) | |
| *C09K 8/512* | (2006.01) | |

(52) U.S. Cl.
CPC ............... *C09K 8/42* (2013.01); *C09K 8/5083* (2013.01); *C09K 8/512* (2013.01); *C09K 8/882* (2013.01); *C09K 8/885* (2013.01); *C09K 8/887* (2013.01)

(58) Field of Classification Search
CPC ............... C09K 8/04; C09K 8/12; C09K 8/24; C09K 8/42; C09K 8/86; C09K 8/88; C09K 8/887

USPC ............................. 507/230; 166/285, 305.1
See application file for complete search history.

(56) References Cited

U.S. PATENT DOCUMENTS

| | | | |
|---|---|---|---|
| 4,498,540 A | | 2/1985 | Marrocco |
| 4,793,741 A | * | 12/1988 | Lahalih ............. C09K 17/28 405/263 |
| 4,796,700 A | | 1/1989 | Sandiford et al. |
| 4,834,180 A | * | 5/1989 | Shu ............... C09K 8/512 166/246 |
| 5,061,387 A | * | 10/1991 | Victorius .................. 507/219 |
| 6,221,152 B1 | * | 4/2001 | Dial ................. C04B 40/0035 106/162.8 |
| 2001/0018973 A1 | * | 9/2001 | Chatterji ............. C04B 16/0625 166/293 |
| 2007/0284104 A1 | * | 12/2007 | Beckman ........... C04B 24/2623 166/293 |
| 2011/0088902 A1 | | 4/2011 | Harrison et al. |
| 2011/0214865 A1 | * | 9/2011 | Reddy ................ C09K 8/5083 166/294 |

\* cited by examiner

*Primary Examiner* — Aiqun Li
(74) *Attorney, Agent, or Firm* — Richard C. Litman

(57) ABSTRACT

The gelling agent for water shut-off in oil and gas wells is a composition that forms a gel to reduce or eliminate the flow of water in a gas or oil well. The composition is formed by mixing polyvinyl alcohol, a polyvinyl alcohol copolymer, or mixtures thereof with an amino-aldehyde oligomer, such as urea formaldehyde or melamine formaldehyde, with or without a cross-linker. The polymer composition can be used to minimize or completely shut off excess water production with insignificant reduction in hydrocarbon productivity.

8 Claims, No Drawings

GELLING AGENT FOR WATER SHUT-OFF IN OIL AND GAS WELLS

CROSS-REFERENCE TO RELATED APPLICATIONS

This application is a division of U.S. patent application Ser. No. 14/483,068, filed on Sep. 10, 2014, now U.S. Pat. No. 9,074,125.

BACKGROUND OF THE INVENTION

1. Field of the Invention

The present invention relates to polymer gels, and particularly to a gelling agent for water shut-off in oil and gas wells that enables retarding the fluid flow of water from subterranean oil and gas reservoirs using gel compositions formed by crosslinking water soluble polymers (such as polyvinyl alcohol) with urea-formaldehyde oligomer.

2. Description of the Related Art

Normally, when oil reservoirs become mature, most oil reservoirs produce water mixed with oil in their production lifetime. In some cases, even though substantial flows of hydrocarbons have been shown, water production is so great and water disposal costs so high that hydrocarbon production is not economical. Therefore it is desirable to find a way to reduce or shut off the flow of water while permitting hydrocarbon production to continue.

If the water production is reduced by some treatment (such as polymer gels) for water shut-off, then this might have a positive effect on increasing oil production. The excessive water production causes many problems and becomes very costly when the water cut increases. Water production could be a result of many reasons, including weak formation due to fractures connecting the water zone with the oil-producing zone. It can also be caused by water coning, which is the most common case, due to the high pressure differential between water and oil zones. Other factors that may cause water production include microcracks in cement sheet, closeness of perforations to the water zone, and high oil/water viscosity ratio, among other things.

For radial flow, where there are no fractures in the oil or gas well, the polymer gel material could be considered effective if it can reduce the permeability to water by more than a factor of ten and preferably by more than a factor of twenty. At the same time, the gel must reduce permeability to oil by less than a factor of two, if oil zones are not protected during placement. There is no universal treatment method to treat excessive water production in producing oil wells. However, several techniques were developed and used, which include: mechanical isolation of the water-producing zone, use of gravel packing or placing of cement plugs inside the casing, or the use of cement squeeze, or finally, the use of inorganic gels (such as sodium silicate) or organic polymeric gel systems.

The non-polymeric systems, e.g., cement squeeze, were used and reported by some researchers with some limited success. The use of inorganic gels, e.g., sodium silicate with hydrochloric acid, was tried by many researchers, also with some limited success. Organic polymer gel systems have also met with limited success.

Thus, a gelling agent for water shut-off in oil and gas wells solving the aforementioned problems is desired.

SUMMARY OF THE INVENTION

The gelling agent for water shut-off in oil and gas wells is a composition that forms a gel to reduce or eliminate the flow of water in a gas or oil well. The composition is formed by mixing polyvinyl alcohol, a polyvinyl alcohol copolymer, or mixtures thereof with an amino-aldehyde oligomer. The polymer composition can be used to minimize or completely shut off excess water production with insignificant reduction in hydrocarbon productivity.

The gelling agent is prepared by dissolving the PVA at a concentration of 10%-12%; preparing a solution of the amino-aldehyde oligomer at a concentrations of 40% to 85%; adding the PVA solution to the amino aldehyde oligomer in a ratio of 10% to 50% by weight of the final polymer composition; optionally adding a cross-linker either before injection or after injection of the final polymer composition into the well in a subterranean formation; adding a retarder, if needed, to delay the gel time of the polymer composition; and optionally adding an accelerator to accelerate the gel time of the polymer composition.

These and other features of the present invention will become readily apparent upon further review of the following specification.

DETAILED DESCRIPTION OF THE PREFERRED EMBODIMENTS

The gelling agent for water shut-off in oil and gas wells combines an amino-aldehyde oligomer with a water-soluble polymer (polyvinyl alcohol (PVA)) and other optional additives, such as dispersing agents, either with or without cross-linking agents. The cross-linking agents (if present) include, but are not limited to, hydrochloric acid, boric acid, borax, acetic acid, toluene-P-4-sulfonic acid, glycol, glutardialdehyde, ammonium sulfates, ammonium chlorides, and others. As described below, various polymer compositions were prepared from these components with different solution concentrations. Also, various cross-linking agents were sometimes used at different concentrations in the final polymer compositions. Tests were carried out to determine the most important properties of these polymeric gels, namely, the viscosity, the gelation time, the gel type and gel strength, the relative thermal stability of these gels at various elevated temperatures and their tendency to synerese at longer ageing time at elevated temperatures and shrink and produce water. Finally, the performance of these gelants/gels was evaluated for their ability to effect water shut-off with significant results in reducing or eliminating water production with insignificant reduction in hydrocarbon productivity.

The polymer composition can be prepared aboveground prior to its injection into the zone to be treated with the needed properties in terms of gel time, gel strength and gel stability at reservoir conditions. The polymer gelants/gels can significantly reduce water productivity with minimal impact in oil and gas production when they are injected in oil and gas wells, with and without zone isolation.

The polymer composition is self-cross-linkable and comprises multi-component polymers, chemicals and additives including, but not limited to, a water soluble polymer, such as polyvinyl alcohol (PVA) with molecular weight between 15,000 g/mol to 146,000 g/mol and with degree of hydrolysis between 87% to 99% and with solid content in polymer composition between 10% to 50%; and an amino-formaldehyde oligomer, such as urea-formaldehyde or melamine formaldehyde with solid content in polymer composition between 50% to 90%; and optionally including other additives, such as dispersing agents. An example of the oligomer might be sulfonated melamine formaldehyde with solid content ranging from 5% to 20%, with or without a cross-linker.

In some embodiments, if a cross-linker is needed and used, it is either a weak acid (boric acid or acetic acid), or a salt (borax, ammonium chloride and ammonium sulfate) or other weak aldehydes (such as glyoxal, glutardialdehyde, and others).

In other embodiments, accelerators and retarders were added to the polymer composition to control the properties of the gelants/gels, such as the gelation time, viscosity, gel strength, and gel stability. Urea=formaldehyde (UF) and sulfonated melamine formaldehyde (SMF) were synthesized according to procedures outlined in U.S. Pat. Nos. 4,686,790 and 4,677,159, respectively, which are hereby incorporated by reference in their entirety.

Example 1

Preparation of Urea-Formaldehyde

The preparation of urea-formaldehyde (UF) followed a procedure that was described in U.S. Pat. No. 4,686,790, which is hereby incorporated by reference in its entirety. Formaldehyde was heated to 80° C., its pH was raised to 8.5, and then a solution of water and urea (100 gm $H_2O$+86 gm Urea) that was separately prepared was added. The pH of the solution was again set to 8.5. The mixture was then allowed to react at 80° C. for 30 minutes. After 30 minutes, the pH of the mixture was lowered to 4.8 by adding sulfuric acid, and then allowed to react for another 30 minutes. After 30 minutes, the pH was raised to 7.0, and then (50-100) gm urea was added. When the urea dissolved completely, after 5.0 minutes the solution came to equilibrium, and then the pH of the solution was lowered to 4.8 by adding formic acid. The mixture is then allowed to cook for 30 minutes. After 30 minutes, the pH of the solution was raised to 8.0 by adding KOH, and then allowed to cool to room temperature. The additive, thus prepared, was filtered and preserved in a bottle after some methanol was added to cap the reaction. The solid contents ranged between 40-80%, and the viscosities ranged between 500 to 6500 cP when measured at 20° C. The average molecular weight for the prepared UF ranged from 4400 to 7350, and the number average molecular weight ranged from 870 to 930, with polydispersity ranging from 5.1 to 7.9.

Example 2

Preparation of Sulfonated Melamine Formaldehyde

The preparation of the sulfonated melamine formaldehyde (SMF) resins followed a procedure that was developed before in U.S. Pat. No. 4,677,159, which is hereby incorporated by reference in its entirety. The preparation procedure follows four steps. In the first step, a formalin solution of 18% concentration is prepared by dissolving 50.34 g of 94.6% paraformaldehyde in 230 ml of water. The reaction mixture is heated at 50° C. for 30 minutes after its pH is raised by the addition of 0.5 ml of 10 N NaOH. After the solution becomes clear, 88 ml of water is added to it, and the solution is heated at 50° C. for an additional 15 minutes. Then, the pH of the solution is raised to 11.35 and 50 g of melamine is added to it. Upon addition of melamine, it was noted that the temperature of the reaction mixture increases by about 4-5° C., then falls back gradually to 50° C. within 15 minutes, during which time the melamine dissolves completely by reacting with formaldehyde. Sodium meta-bisulfite (37.7 g) and water (20 ml) are then added to the solution, causing an increase in temperature of 4-5° C. while the sulfite salt is dissolving. In the second step, the solution is kept at around 50° C. for 5 minutes, and then the temperature is raised to 80° C. in 15 minutes and kept at the new temperature for an additional 45 minutes while maintaining the same pH. In the third step, the solution is then cooled rapidly (approximately 5 minutes) to 50° C. and 12 ml of 14.5N $H_2SO_4$ is added to it, causing a drop in pH to 3.50 and an increase in temperature of 4-5° C. The temperature drops gradually back to 50° C. within 15 minutes, and the solution is kept under these conditions with continuous stirring for an additional 95 minutes, during which it becomes very viscous. The solution is neutralized afterwards by careful addition of a slurry of calcium oxide (CaO) in water. The amount of CaO needed is approximately 8.0 g. In the fourth step, and after neutralization, the solution is heated to 80° C. in about 20 minutes and kept at that temperature for 60 minutes with continuous stirring. The solution is finally filtered to remove calcium sulfate and other solid particulates, cooled to room temperature, and treated with sodium hydroxide to adjust its pH to 9.5.

The solution prepared according to the above procedure has a solid content of approximately 23%. The solid content is adjusted to 20% by addition of water, and the final viscosity of the solution at 20° C. is 4.20 centipoise (cP). Since the concentration strongly affects the kinetics of polymerization reactions, a number of preparations were carried out in which the concentration of the reactants was increased to values higher than those mentioned in the standard procedure described above. In these concentration studies, the procedure used was exactly the same as that described above for the standard procedure in that the same masses of melamine, paraformaldehyde, and sodium metabisulfite were used, but the amount of water added initially during the preparation of paraformaldehyde was decreased, and the additional water used in subsequent steps was eliminated completely. SMF resins were prepared with a final concentration of 43%.

Examples 3-23

Preparation of Various Polymer Compositions

Various polymeric compositions were then prepared by mixing different proportions of each using bench top mixers. Urea-formaldehyde (UF) with sulfonated melamine formaldehyde (SMF) and other additives was used in single form and in combinations thereof. The raw materials of urea, melamine, formaldehyde, sulfuric acid and caustic soda were used in the preparation of new compositions. Commercial polymers, such as carboxy methyl cellulose (CMC) and polyvinyl alcohol (PVA), were used. The polyvinyl alcohol used had molecular weights ranging from 15,000 g/mol to 146,000 g/mol. All of the acids, alcohols and other chemicals that were used for various compositions were of the technical grade type, and were obtained off the shelf. Other additives that were used are described in examples 1 and 2.

Table 1 shows the physical properties of 21 polymer compositions that were prepared for evaluation. The rows in Table 1 summarize the 21 samples of the gelling agent, where solutions 1, 2, 3, 10, 11 and 16 are for urea-formaldehyde (UF) and PVA with different proportions of 60/40, 60/40, 60/40, 70/30, 80/20 and 50/50 UF/PVA, respectively, which also can be distinguished by their different concentrations. Table 1 shows the main constituents and their concentrations in the polymer matrix, and the concentrations and densities of the bulk polymer compositions. The table also shows the various organic and inorganic cross-linkers used, along with their weight concentrations in the polymer matrix and the pH of the final polymer composition solutions. It should be noted that the concentrations of the cross-linkers are insignificant as compared to the weight percent of the UF and PVA. However it should be noted that all the combined weight percentages all add up to 100%. In summary, the main constituents in the polymer compositions include urea-formaldehyde and polyvinyl alcohol with concentrations of the final polymer solutions ranging from 8.4% to 32.1% after different percentages of different cross-linkers were added. Other constituents include ethyl acetate, furfuryl alcohol, butyl acetate, sulfonated naphthalene formaldehyde, sulfonated melamine formaldehyde, lignosulfonates and styrene-acrylate copolymer. Different cross-linkers with different percentages in the polymer compositions include hydrochloric acid (0.412%-1.5%), boric acid (0.0125%-0.1%), borax (0.015%-0.1%) and acetic acid (0.11%-10%). The percentages of the cross-linkers are by weight of the polymers in the compositions. The pH of the resulting compositions depends on the type and amount of the cross-linkers used, where they range from 0.25-2.21 in the case of HCl, to 5.6-9.9 in the case of Borax.

TABLE 1

Physical Properties of some of the Polymer Compositions Prepared for Water Shut-off in Oil and Gas Wells

| Example No. | Component/ Composition | Cross-linkers(% wt. of Composition) | pH | Concentration (g/cc) |
|---|---|---|---|---|
| 1 | UF + PVA (60/40) | No Acid | 5.6 | 23.00 |
| | | HCl (0.412-1.24) | 1.89-1.3 | |
| | | Boric (0.0125-0.1) | 5.6-5.3 | |
| | | Borax (0.0125-0.1) | 5.6-7.0 | |
| | | Acetic (0.025-0.4) | 5.0-4.1 | |
| 2 | UF + PVA (60/40) | HCl (0.412-1.24) | 2.21-1.2 | 12.83 |
| | | Boric (0.025-0.1) | 5.6-5.4 | |
| | | Borax (0.025-0.1) | 5.6-6.12 | |
| | | Acetic acid (1-10) | 4.0-3.21 | |
| 3 | UF + PVA (60/40) | HCl (0.412-1.24) | 2.2-1.2 | 8.40 |
| | | Boric (0.025-0.1) | 5.7-5.6 | |
| | | Borax (0.025-0.1) | 6.5-6.45 | |
| | | Acetic acid (1-10) | 3.9-3.3 | |
| 4 | UF + FA + PVA + EAC | HCl (0.33-1.5) | 1.1-0.25 | 43.00 |
| | | S.A. (0.5-1.0-1.5) | 4.0-1.63 | |
| 5 | FA + EAC | S.A. (0.5-1.0) | 1.1-0.5 | 34.30 |
| 6 | UF + PVA + SMF | Acetic acid (0.11-0.44) | 5.7-5.0 | 22.49 |
| 7 | UF + PVA + SMF | Acetic acid (0.11-0.44) | 5.7-5.25 | 24.34 |
| 8 | 3 + 4 | Acetic acid (0.25-1.0) | 4.7-4.15 | 16.28 |
| 9 | 3 + 5 | Acetic acid (0.25-1.0) | 4.7-4.16 | 14.69 |
| 10 | UF + PVA (70/30) | Boric (0.025-0.1) | 5.9-5.85 | 25.18 |
| | | Borax (0.025-0.1) | 6.2-7.2 | |
| | | Acetic (0.11-0.44) | 5.2-4.2 | |
| 11 | UF + PVA (80/20) | No Acid | 5.6 | 32.10 |
| | | Boric (0.025-0.1) | 6.1-5.4 | |
| | | Borax (0.025-0.1) | 6.4-7.46 | |
| | | Acetic (0.11-0.44) | 5.2-4.2 | |
| 12 | UF + PVA + SNF | No Acid | 6.11 | 22.68 |
| | | Acetic (0.11-0.44) | 5.2-4.2 | |
| 13 | UF + PVA + SNF | No Acid | 6.31 | 25.13 |
| | | Acetic (0.11, 0.22, 0.44) | 5.8-4.9 | |
| 14 | UF + PVA + SL | No Acid | 6.90 | 21.50 |
| | | Acetic (0.11-0.44) | 6.2-4.9 | |
| 15 | UF + PVA + SL | No Acid | 7.04 | 23.20 |
| | | Acetic (0.11-0.44) | 6.8-5.3 | |
| 16 | UF + PVA (50/50) | No Acid | 5.26 | 17.58 |
| 17 | UF + PVA + SF* | No Acid | 5.11 | 19.99 |
| 18 | UF + PVA + SF* | No Acid | 5.38 | 23.45 |
| 19 | UF + SF | No Acid | 5.19 | 29.40 |
| 20 | UF + PVA + SF | No Acid | 5.19 | 29.00 |
| | | Boric (0.22) | 5.2 | |
| | | Borax (0.22) | 5.97 | |
| | | Butyl Acetate(0.22) | 5.14 | |
| | | Acetic (0.22) | | |
| 21 | UF + PVA + EAC | No Acid | 4.58 | 17.64 |
| | | Acetic (0.22) | 2.72 | |

*UF: Urea Formaldehyde
PVA: Polyvinyl Alcohol
EAC: Ethyl Acetate
F.A: Furfurly Alcohol
S.A: Toluene-4-P-Sulfonic Acid
A.A: Acetic Acid
B.A: Butyl Acetate
SNF: Sulfonated Naphthelene Formaldehyde
SL: Lignosulfonates
SF: Styrene-Acrylate co-polymer
SMF: Sulfonated Melamine Formaldehyde Table 2 is a summary of the main characteristics of the 21 polymer compositions that were developed and reported in Table 1. The pertinent characteristics include the polymer composition concentration, the 100% gelation time at various temperatures ranging from 60° C. to 120° C., the elastic nature of the formed gel and its stability at the test temperature, as well as after it has been aged at 90° C. for extended periods of time exceeding 1018 hrs. The 100% gel time for the various compositions range from about one hour at 80° C. to about 33 hours at 60° C., and some of these compositions never formed a gel (even after being aged for more than 200 hrs. at 80° C.) in the absence of cross-linkers. The gels that were formed at the temperatures shown were aged at 90° C. for extended periods of time exceeding 1000 hours to check their degree of stability. Two main parameters were observed, namely, the gel type, and the syneresis and shrinkage and production of water as expressed in percent of water production. It was found that for all the 21 polymer compositions that were prepared and tested, no syneresis (spontaneous separation of a liquid from a gel due to contraction of the gel) took place, even after they have been aged at 90° C. for more than 1018 hours. This might be due to the absence of cross-linkers in some of the compositions. Another observation is that the various gels that were formed maintained their elastic nature for a certain period of time when aged at 90° C., but changed to viscous gels and lost their elastic nature after that aging time. However, the elastic nature of some formed gels can be prolonged for extended periods of time if certain additives are added to these polymer compositions. These additives include some dispersants, such as sulfonated naphthalene formaldehyde and sulfonated melamine formaldehyde. On the other hand, some of these dispersants can accelerate the loss of elasticity, and these include lignosulfonates. Gel elasticity was also measured, and a rating was given to various formulations ranging from zero to ten, where zero (0) refers to liquid-like and ten (10) refers to strong elastic gel. Gel elasticity for the various gels that are reported in Table 2 ranged from 5 to 8.

TABLE 2

Physical Properties of Polymer Compositions

| No. | Polymer composition | Conc. (%) | 100% Gelation Time (hrs.)* 60° C. | 80° C. | 90° C. | 110° C. | Gel Elasticity* 60° C. | 80° C. | 90° C. | 110° C. | Gel Stability aged at 90° C. Gel type at various aging time (hrs.) | %-water Produced |
|---|---|---|---|---|---|---|---|---|---|---|---|---|
| 1 | (UF + PVA) 60/40 | 23 | 33 | 9.75 | 6 | 2.00 | 5 | 5 | 5 | 5 | elastic < 858 < viscous fluid | 0 |
| 2 | (UF + PVA) 60/40 | 12.83 | No Gel | No Gel | No Gel | No Gel | N/A | N/A | N/A | N/A | N/A | 0 |
| 3 | (UF + PVA) 60/ | 7.65 | No Gel | No Gel | No Ge | No Gel | N/A | N/A | N/A | N/A | N/A | 0 |
| 4 | (UF + FA + PVA + EAC) | 43 | No Gel | No Gel | No Gel | No Gel | N/A | N/A | N/A | N/A | N/A | 0 |
| 5 | (FA + EAC) | 34.3 | No Gel | No Gel | No Gel | No Gel | N/A | N/A | N/A | N/A | N/A | 0 |
| 6 | (UF + PVA + SMF) | 22.5 | 25 | 6.5 | 3.75 | 1.25 | 6 | 6* | 7* | 7.00 | elastic > 528 | 0 |
| 7 | (UF + PVA + SMF) | 24.34 | 22 | 5 | 2.75 | 1.00 | 6 | 6 | 7 | 7.00 | elastic > 525 | 0 |
| 8 | (UF + PVA) | 16.28 | N/A | No Gel | No Gel | No Gel | N/A | N/A | N/A | N/A | N/A | 0 |
| 9 | (UF + PVA) | 14.69 | N/A | No Gel | No Gel | No Gel | N/A | N/A | N/A | N/A | N/A | 0 |
| 10 | (UF + PVA) 70/30 | 25.18 | 28.5 | 8 | 4 | 1.50 | 6 | 6 | 6 | 6.00 | elastic < 888 < viscous gel | 0 |
| 11 | (UF + PVA) 80/20 | 32.1 | 26 | 7 | 3 | 1.25 | 6 | 6 | 6 | 6.00 | elastic < 984 < viscous gel | |
| 12 | (UF + PVA + SNF) | 22.68 | 14 | 10 | 8.5 | 3.00 | N/A | 6 | 8 | 8.00 | elastic < 1018 < elastic | |
| 13 | (UF + PVA + SNF) | 25.13 | 16 | 12.5 | 10.5 | 3.50 | N/A | 6 | 8 | 8.00 | elastic < 1018 < elastic | |
| 14 | (UF + PVA + SL) | 20.5 | 39 | 17 | 14 | No Gel | N/A | 5 | 5 | N/A | soft elastic < 792 < viscous fluid | 0 |
| 15 | (UF + PVA + SL) | 23.2 | 50 | 27 | 25 | No Gel | N/A | 5 | 5 | N/A | soft elastic < 792 < viscous fluid | 0 |
| 16 | (UF + PVA) | 17.58 | 50 | 24.50 | 21.00 | No Gel | N/A | 4 | 4 | N/A | elastic > 525 | 0 |
| 17 | (UF + PVA + SF") | 20.0 | 22 | 8.50 | 7.00 | No Gel | 5 | 5 | 7 | N/A | elastic > 525 | 0 |
| 18 | (UF + PVA + SF) | 23.45 | 12 | 4.50 | 3.25 | 1.50 | 6 | 8.00 | 8.00 | 5.00 | elastic > 525 | 0 |
| 19 | (UF + SF") | 29.4 | N/A | No Gel | No Gel | No Gel | N/A | N/A | N/A | N/A | N/A | 0 |
| 20 | (UF + PVA + SF) | 29 | 9 | 2.25 | 1.75 | 1.00 | 7 | 8.00 | 8.00 | 5.00 | elastic > 525 | 0 |
| 21 | (UF + PVA + EAC) | 18.96 | 44 | 14.00 | 10.00 | No Gel | 5 | 5 | 5 | N/A | elastic | 0 |

*Gel elasticity grading: rating from 0 to 10 where 0 is liquid form and 10 is very strong elastic gel.
4: soft elastic gel
5: Medium soft elastic gel
6: Elastic gel
7: medium elastic gel
8: strong elastic gel The effect of several variables on the characteristics and behavior of the newly developed polymer gels (both concentrated and diluted) was fully investigated and are reported in this patent disclosure. These variables include: the cross-linkers type and concentration, the concentration of the polymer compositions, brine (3% KCl), dispersants and other additives, shear rates, pressure imposed, and thermal aging of some polymer compositions with different percentages of brine.

Example 24

Effect of Cross-Linkers on the Gel Properties of Concentrated Polymers

The effect of cross-linker type and its concentration on gelling behavior of the concentrated polymer compositions was evaluated. Tables 3 and 4 are a summary of the 100% gelation time for polymer composition number 3, where the solution concentration is about 23%, with different cross-linkers tested at different test temperatures. The type of gel and the percent of water produced upon aging at 90° C. as syneresis are also shown. The results show that the main parameters that control the gelling behavior are the concentration of the polymer composition, the type of cross-linker and its concentration, the temperature of testing and the type and the constituents of the polymer composition used. When hydrochloric acid (HCl) is used as a cross-linker, initial gel formation took place in the first half hour, and complete gelation took place in about 7.25 hours for all the HCl concentrations used, which range between about 0.4% to about 1.2% at 60° C. However, HCl tends to produce gels that produce water upon prolonged exposure at 60° C. Boric acid with concentrations ranging from 0.0125% to 0.25% produced complete gels in about 33 hrs at 60° C. for solution No. 3. Similarly, Borax with concentrations ranging from about 0.0125% to 0.25% gave 100% gel in about 33 hours to 45 hours at 60° C. This shows that Borax is slower in producing the gels than Boric acid. On the other hand, organic cross-linker Acetic Acid with concentrations ranging from 0.0125% to 0.66% by weight of the polymer gave 100% gel in 28 hours to 3.5 hours respectively when tested at 60° C. It was found that Boric acid and Borax delay gelation time, while acetic acid tends to accelerate gelation. It was also found that upon aging at 80° C., all the gels cross-linked with Boric acid and Borax remained elastic, while those cross-linked with acetic acid remain elastic up to more than 1000 hours, and transformed into spongy gels after that, with the production of some water. The production of water is due to syneresis of these gels when they are cross-linked with higher doses of acetic acid. Also, as the concentration of acetic acid increases, the gel elasticity decreases with aging time. Ammonium chloride ($NH_4Cl$) and ammonium sulfate $(NH_4)_2SO_4$ produce gels that are spongy, but significant syneresis took place upon storage at 90° C. For example, while gelation time is almost instant with polymer solution number 3 (~0.25 hour gelation time), 40% of water was produced as a result of syneresis of the formed gel with these two cross-linkers. The results also show that as temperature increases, the gelation time decreases. Gelation times of some concentrated and diluted polymer compositions with acetic acid at room temperature are shown in Table 3.

Table 3 shows that composition No. 3 has a gelation time at ambient temperature ranging from 8 hours when 10% acetic acid is added to 1920 hours without the addition of acetic acid. Similar trends are also shown for other diluted and concentrated polymer compositions.

The effect of other cross-linkers, such as $NH_4Cl$, $(NH_4)_2SO_4$, glyoxal, and glutardialdehyde on the gelation time of composition No. 1 is also shown in Table 4. Gelation time is very fast for both $(NH_4)_2SO_4$ and $NH_4Cl$ (about 0.25 hours when tested at 60° C. and 80° C.). However, the gels went through syneresis and produced water after only 48 hours of aging at 90° C. On the other hand, Glyoxal and Glutardialdehyde are very slow cross-linkers, where gelation took place after 32 hours at 60° C., which is practically the same gelation time for polymer composition number 1 without cross-linkers.

TABLE 3

Gelation Time for Various Compositions

| Polymer Composition | Concentration (%) | Acetic Acid (%) | Gelation Time (Hrs.) |
|---|---|---|---|
| 1 | 23.00 | 0.00 | 1920 |
| 1 | 23.00 | 2.00 | 35 |
| 1 | 23.00 | 3.00 | 27 |
| 1 | 23.00 | 4.00 | 24 |
| 1 | 23.00 | 5.00 | 20 |
| 1 | 23.00 | 10.00 | '8 |
| 1 + 0.11% AA | 23.00 | 0.11 | 349 |
| 11C + 0.11% AA | 24.30 | 0.11 | 612 |
| 12D + 0.11% AA | 20.18 | 0.11 | 225 |
| 11C-1 + 3% AA | 18.00 | 3.00 | 126 |
| 12D-1 + 3% AA | 18.00 | 3.00 | 56 |
| 1-1 + 3% AA | 18.00 | 3.00 | 75 |
| 11C-1 + 3% AA | 18.00 | 1.00 | 228 |
| 12D-1 + 1% AA | 18.00 | 1.00 | 79 |
| 1-1 + 1% AA | 18.00 | 1.00 | 115 |

TABLE 4

Gelation Time and Stability of Polymer Composition 1 With Various Cross-Linkers

| Cross-Linker | Cross-linker Wt % | 100% Gelation Time (hrs.) | | | | Gel Stability aged at 90° C. | |
|---|---|---|---|---|---|---|---|
| | | 60° C. | 80° C. | 90° C. | 110° C. | Gel type at various aging time (hrs) | $H_2O$ % |
| None | 0 | 33.00 | 9.75 | 6.00 | 2.00 | elastic < 858 < viscous | 0 |
| HCl | 0.412 | 7.25 | N/A | N/A | N/A | Spongy > 766 hrs | 36 |
| | 0.825 | 7.25 | N/A | N/A | N/A | Spongy > 766 hrs | 52 |
| | 1.24 | 7.25 | N/A | N/A | N/A | Spongy > 766 hrs | 56 |
| Boric Acid | 0.0125 | 33.00 | 9.75 | 6.00 | N/A | elastic < 858 < viscous | 0 |
| | 0.025 | 33.00 | 9.75 | 6.00 | N/A | elastic < 858 < viscous | 0 |
| | 0.05 | 33.00 | 9.75 | 6.00 | N/A | elastic < 858 < viscous | 0 |
| | 0.1 | 34.00[1] | 9.75 | 6.00 | N/A | elastic < 858 < viscous | 0 |
| | 0.25 | 35.00 | 11.75 | 7.00 | 2.50 | elastic < 858 < viscous | 0 |
| Borax | 0.0125 | 33.00 | 9.75 | 6.00 | N/A | elastic < 858 < viscous | 0 |
| | 0.025 | 33.00 | 10.75 | 6.00 | N/A | elastic < 858 < viscous | 0 |
| | 0.05 | 34.00 | 10.7 | 6.00 | N/A | elastic < 858 < viscous | 0 |
| | 0.1 | 34.00 | 12.75 | 7.00 | N/A | elastic < 858 < viscous | 0 |
| | 0.25 | 45.00 | 23.00 | 19.50 | 11.00 | elastic < 858 < viscous | 0 |
| Acetic Acid | 0.0125 | 28.00 | 8.00 | 4.00 | 1.75 | elastic < 858 < viscous | 0 |
| | 0.025 | 22.00 | 7.00 | 4.00 | 1.50 | elastic < 858 < viscous | 0 |
| | 0.05 | 18.00 | 3.75 | 3.25 | 1.25 | elastic < 858 < viscous | 0 |
| | 0.11 | 10.00 | 2.00 | 1.00 | 0.50 | elastic < 642 < spongy | 18 |
| | 0.22 | 7.00 | 1.50 | 0.50 | 0.35 | elastic < 642 < spongy | 18 |

TABLE 4-continued

Gelation Time and Stability of Polymer Composition 1 With Various Cross-Linkers

| Cross-Linker | Cross-linker Wt % | 100% Gelation Time (hrs.) | | | | Gel Stability aged at 90° C. | |
|---|---|---|---|---|---|---|---|
| | | 60° C. | 80° C. | 90° C. | 110° C. | Gel type at various aging time (hrs) | H$_2$O % |
| | 0.44 | 5.00 | 1.25 | 0.50 | 0.25 | elastic < 426 < spongy | 18 |
| | 0.66 | 3.50 | 1.00 | 0.50 | 0.25 | elastic < 282 < spongy | 18 |
| NH$_4$Cl | 1 | 0.25 | 0.25 | N/A | N/A | spongy, 1344 hrs | 40** |
| | 2 | 0.25 | 0.25 | N/A | N/A | spongy, 1344 hrs | 40** |
| (NH$_4$)$_2$SO$_4$ | 0.5 | 0.50 | 0.50 | N/A | N/A | spongy, 1344 hrs | 40** |
| | 1 | 0.25 | 0.25 | N/A | N/A | spongy, 1344 hrs | 40** |
| Glyoxal | 0.5 | 32.50 | 9.00 | N/A | N/A | Elastic, 1128 hrs | 0 |
| | 1 | 32.00 | 8.00 | N/A | N/A | Elastic, 1128 hrs | 0 |
| Glutardialdehyde | 0.5 | 32.50 | 8.75 | N/A | N/A | Elastic, 1128 hrs | 0 |
| | 1 | 32.00 | 7.50 | N/A | N/A | Elastic, 1128 hrs | 0 |

*Gels were aged at 80° C. for 766 hrs
**Gels were aged at 90° C. and syneresis after only 48 hrs Example 25

Effect of Cross-Linkers on Gel Properties of Diluted Polymers

The effect of some cross-linkers on the gelation time, gel strength and gel stability of diluted polymer compositions was also evaluated. Ammonium chloride (NH$_4$Cl) and Ammonium sulfate (NH$_4$)$_2$SO$_4$ produce gels that are spongy, but significant syneresis takes place upon storage at 90° C. For example, while gelation time is almost instant with polymer solution No. 1 (~0.25 hour-gelation time), 40% of water was produced as a result of syneresis of the formed gel with these two cross-linkers, as was shown in Table 4. The same trend was observed when these two cross-linkers were used with polymer solutions Nos. 1-3, 8 and 9, where the water produced upon syneresis was about 80%, 36% and 44%, respectively. Acetic acid, on the other hand, shows to be a very good cross-linking agent for our polymer solutions, and no syneresis took place, even after storing the formed gels at 90° C. for more than 1300 hrs. Also, glyoxal and glutardialdehyde produce good elastic gels when they are used as cross-linkers with polymer solution Nos. 1 and 12. No syneresis was observed when they are used with polymer solution No. 1 even after aging of gels for more than 1120 hours at 90° C. However, 20% of water was produced when these two cross-linkers were used with polymer solution No. 12, indicating that syneresis took place after storing the gel at 90° C. for more than 1440 hrs. The gels that were formed from polymer solution No. 1 were elastic, while those formed from solution No. 12 were spongy, and this might be attributed to the syneresis of the latter upon storage or aging at 90° C. Finally, it was noted that acetic acid is more effective as a cross-linker than glyoxal or glutardialdehyde because far smaller amounts of acetic acid are used to gel the polymer solution for the same period of time. For example, for 1% of glyoxal or glutardialdehyde by weight of polymer solution No. 1, the gelation time is about 32 hrs. at 60° C., compared to a gelation time of only about 28 hours when 0.0125% of acetic acid (AA) is used. Therefore, acetic acid is more economical to use and produces gels that are more elastic and more stable when aged at 90° C. for extended periods of time, and without any syneresis. The gel strength and gel elasticity for some polymer compositions were graded qualitatively from 1 to 10, where 10 is a very strong and elastic gel when it is poked with a rod or solid object, and number 1 is for very soft and flowing gel. Polymer composition No. 1 gave an intermediate strong gel, where it is very elastic and somewhat soft, and was given a grade of 5-6 for all temperatures ranging from 60° C. to 90° C. Polymer composition No. 11 gave a little more stronger gel and was given a grade of 6-7, while polymer composition No. 11C, which is the same as polymer composition No. 11 except that it is more diluted, was much softer and was given a grade of 3-4, depending upon the degree of cross-linking. It was found that the percentage of cross-linking agent increases the grading of the gel formed, and this is evident in polymer compositions No. 11C and No. 12D. For example, polymer composition No. 11C with 0.05% and 0.11% acetic acid as a cross-linker gave gel grades of 3 and 4, respectively. Similarly, polymer composition No. 12D with 0.0%, 0.05%, 0.11% and 0.22% acetic acid as a cross-linker gave a gel strength grade of 5, 6, 7, and 8, respectively. The strongest gel was formed by polymer composition No. 12, where a gel strength grade of 8 was given when they were formed at 80° C. and 90° C. The use of some dispersants with the polymer composition gives rise to the gel elasticity. The effect of pressure is evident on polymer solution 12D-1 where gelation took place after 72 hours at 80° C. with no cross-linkers.

Example 26

Effect of Polymer Composition Concentration on their Gel Properties

The effect of concentration of polymer compositions on gelation behavior was studied. Table 5 shows the effect of polymer concentration on the 100% gelation time of polymer composition No. 1 at different temperatures and for different additives, such as ethyl acetate and acetic acid. Table 5 shows that polymer solution No. 1 concentrations ranging from 7.65% to 23% do not form gels at all temperatures, even after they have been exposed to about 200 hours with acetic acid as a cross-linker. However, the effect of Urea-Formaldehyde (UF) and Polyvinyl alcohol (PVA) concentrations in the main polymer composition matrix has opposite effects. The higher the UF concentration, the faster the composition will gel, and the higher the PVA concentration in the composition, the higher is the 100% gel time for these compositions. Again, syneresis took place when gels that were formed by using such cross-linkers as ammonium sulfate and ammonium chloride after storing at −90° C. Finally, the addition of ethyl acetate (EAC) to the polymer matrix delays gelation from 33 hours to 44 hours when tested for the concentrated polymer composition No. 1 at 60° C., and no gel was formed at higher temperatures of 80° C., 90° C., and 110° C.

thermal aging at 80° C. was investigated. The viscosities were measured using a Haake rotational viscometer at a shear rate of 100 s$^{-1}$. The samples were placed in the viscometer for different periods of time, and they were sheared as time elapsed. The data shows the effect of aging at 80° C., plus the effect of shear rates on the viscosity

TABLE 5

Gelation Time as Affected by Polymer Concentration

| Polymer Comp. | Polymer Conc. % | Cross-Linker Type | Cross-Linker % | 100% Gelation Time (hrs) | | | | H$_2$O % |
|---|---|---|---|---|---|---|---|---|
| | | | | 60° C. | 80° C. | 90° C. | 110° C. | |
| 1 | 23.00 | N/A | 0 | 33 | 9.75 | 6 | 2 | 0 |
| 1-1 | 18.00 | AA | 1 | 60 | 29 | | | 0 |
| | | | 2 | 50 | 25 | | | 0 |
| | | | 3 | 46 | 22 | | | 0 |
| 1-2 | 14.00 | AA | 2 | 73 | 32% | | | 0 |
| | | (NH$_4$)$_2$SO$_4$ | 1 | | 5 | | | 65 |
| 1-3 | 7.65 | NH$_4$Cl | 1 | 17 | 4.75 | | | 80 |
| | | | 2 | 12 | 3.5 | | | 80 |
| | | (NH$_4$)$_2$SO$_4$ | 0.5 | 42 | 17.5 | | | 80 |
| | | | 1 | 30 | 12 | | | 80 |
| 8 | 16.28 | NH$_4$Cl | 0.5 | 6.5 | 2 | | | 36 |
| | | | 1 | 4.5 | 1.5 | | | 36 |
| | | (NH$_4$)$_2$SO$_4$ | 0.5 | 23 | 4 | | | 36 |
| | | | 1 | 12 | 12 | | | 36 |
| 9 | 14.69 | NH$_4$Cl | 0.5 | 1 | 1 | | | 44 |
| | | | 1 | 1 | 1 | | | 44 |
| | | (NH$_4$)$_2$SO$_4$ | 0.5 | 2 | 1.5 | | | 44 |
| | | | 1 | 1 | 1 | | | 44 |
| 1 + EAC* | 17.64 | N/A | 0 | 44 | No Gel | No Gel | No Gel | N/A |
| 1 + EAC ++ AA** | 17.41 | AA | 0.22 | 12 | No Gel | No Gel | No Gel | N/A |

*EAC: Ethyl Acetate, prepared in brine (3% KCl)
**AA: Acetic Acid
***Aging @ 90° C.

Example 27

Effect of Brine on the Properties of Some Polymer Gels

The effect of brine (3% KCl) percentage in the polymer compositions on the polymer gels behavior was investigated. The effect of brine (3% KCl) on the 100% gelation time of polymer composition No. 1 was found to be significant. Data shows that as the brine concentration increases, the 100% gelation time gets delayed quite significantly. For example, increasing the concentration of brine in the polymer matrix from 0% to 20% delays the gelation time from 6 hours to 30 hours when tested at 90° C. However, in the presence of a cross-linker, such as acetic acid with polymer composition No. 1, the effect of brine on the delay of gelation time gets dampened. The same trend was also observed for solutions nos. 11, 11C and 12D. However, it was found that this behavior is due to the dilution effect that the brine has when it is mixed with the various polymer compositions. Therefore, the delay in gel time is due to dilution of the polymer compositions by brine.

Example 28

Effect of Shear Rate on the Properties of Some Polymer Compositions

The effect of shear rate on the viscosity and gelation time of concentrated and diluted polymer compositions upon build-up. It is noticed that shear accelerates cross-linking quite drastically. For example, solution No. 11 appears to approach gelation at about 4-5 hours at a shear rate of 100 s$^{-1}$, while the established gelation time for this solution at zero shear rate is 7.0 hours at 80° C. Similar behavior has been observed for other solutions. For example, polymer solutions no. 12D and no. 1 appear to have gelation times of 8-9 hours under shear of 100 s$^{-1}$, compared to 15 and 9.75 hours at zero shear rates, respectively, when measured at 80° C. Therefore, it can be concluded that shear accelerates gelation times of these polymeric solutions.

The results also show that viscosity build-up increases as the shear rate increases. Furthermore, as the viscosity build-up increases, the gelation time to obtain 100% gelation decreases. This is expected, since shearing the polymer solutions makes the molecules come closer to each other and because of the presence of a cross-linker that accelerates gelation, which tends to increase the viscosity. It should be noted that there are two competing mechanisms that work opposite to each other. One mechanism is that shear rates, for non-cross-linking, non-Newtonian systems, tend to lower the viscosity of the systems. On the other hand, the second mechanism is that for cross-linking and non-Newtonian systems, the viscosity buildup increases with shear due to the closeness of the molecules to each other upon shearing. In both cases, the concentration of the compositions and the concentration of the cross-linker play a significant role. The viscosity builds up, and hence gelation time is accelerated for concentrated solutions. The absence of a cross-linker in polymer solution No. 1 made the solution behave as a non-Newtonian system, where viscosity decreases as shear rate increases. However, polymer solutions No. 11C and 12D, with a cross-linker of acetic acid, behave as dilatant fluids, where the viscosity increases upon high shear. Again, the mechanism of cross-linking upon high shear tends to induce higher viscosities because the cross-linked chains experience elongation flow, and hence, higher viscosity. It is well known that the elastic modulus of polymers experiencing elongation flow is three times that of the shear modulus, and hence, the elongation viscosity is expected to be about three times the viscosity under shear.

Again, as expected, the higher the cross-linker concentration is, the higher the viscosity. However, for dilute polymer solutions, such as Nos. 1-2+2% AA, where the concentration is about 16%, the viscosity at a shear rate of 100 s$^{-1}$ gave slightly higher viscosity than a 200 s$^{-1}$ shear rate, indicating that less shear is preferred to induce cross-linking. But in all cases, viscosity increases upon shearing and thermal aging.

Example 29

Effect of Pressure on the Gelation Time of Some Polymer Compositions

The effect of pressure on the gelation time of some polymer compositions was investigated and the results are shown in Tables 6 and 7. Polymer solution no. 1 has a gelation time of 9.75 hours when it was stored at 80° C. and under an atmospheric pressure of 14.7 psi, compared to 3.5 hours of gelation time after it had been stored at 80° C. under 1000 psi pressure. Similar trends are noted for other concentrated polymer solutions, including Nos. 11, 11C, 12, and 12D, which all exhibit accelerated gelation time under pressure, both with and without a cross-linker. Therefore, it can be concluded that the polymer solutions reported here would gel much faster when they are sheared and stored at higher pressures that resemble reservoir conditions, than those polymer compositions that are stored at atmospheric pressure under static conditions. The data in Table 6 shows that the gelation time was accelerated as the pressure increases, signaling more cross-linking, and hence faster gelation for concentrated polymer solutions. Table 7 shows the effect of pressure on gelation time of diluted polymer compositions prepared in brine. Again, the effect of pressure in inducing gelation is not significant in the presence of brine.

TABLE 6

Effect of Pressure on the Gelation Time of Concentrated Polymer Compositions Stored at 80° C. and 1000 psi

| Polymer Solution | Concentration (%) | Cross-Linker (Acetic Acid) (Wt. %) | Gelation Time (hrs) | |
|---|---|---|---|---|
| | | | At 1000 psi | At 14.7 psi |
| 1 | 23 | 0 | 3.5 | 9.75 |
| 11 | 32.1 | 0 | 2.5 | 7.00 |
| 12 | 22.68 | 0 | 3.0 | 10.00 |
| 12D | 20.18 | 0 | 6.5 | 15.00 |
| | | 0.11 | 4.0 | 4.50 |
| 11C | 24.07 | 0 | 6.5 | 18.50 |
| | | 0.11 | 3.0 | 4.75 |

TABLE 7

Effect of Pressure on the Gelation Time of Diluted Polymer Compositions Prepared in 3% KCl Brine and Stored at 80° C. and 1000 psi

| Polymer Comp. | Polymer Conc. (%) | Cross-Linker (Acetic Acid) (Wt. %) | % Gelation Stored for 24 hrs. | |
|---|---|---|---|---|
| | | | at 1000 psi | at 14.7 psi |
| 1-2 | 11.95 | 2 | (35% gel) | (25% gel) |
| 11C-2 | 13.01 | 2 | (35% gel) | (25% gel) |
| 12D-2 | 11.35 | 2 | (35% gel) | (25% gel) |

Example 30

Effect of Brine on the Rheology and Gelation Time of Some Polymer Compositions

The effect of brine (3% KCl) on the rheology and gelation time of some polymer compositions was evaluated. The viscosities of various polymer solutions are measured with different brine (3% KCl) concentrations upon aging at 80° C. using the Haake rotational viscometer at a shear rate of 100 s$^{-1}$. Table 8 shows the viscosities and gelation times of various polymer solutions with and without brine upon aging at 80° C. Brine concentrations ranging from 0.0% to 15% by weight of polymer solutions were added to various polymer compositions to see their effect on the gelation time and on the viscosity of the compositions. Table 8 shows that as the concentrations of brine increases from 0.0% to 15% in the polymer compositions, gelation time gets delayed by a factor of two to ten, and even more in some cases. Similarly, the viscosity of various polymer compositions drops by a factor of two when the brine concentration increases from 0.0% to 15%. The effect of brine accompanied with shear rate and aging time is shown in the table. In all cases, an increase of brine reduces the viscosity and increases the gelation time for all of the polymer compositions that were tested. The data shows that about 50% viscosity reduction could take place for brine concentrations ranging from 0.0% to 15% by weight of the polymer solution. Again, the reduction in viscosity and increase in gelation time are due to the dilution of the polymer compositions by the inclusion of brine.

Table 8 also shows the effect of brine on viscosity reduction of various diluted polymer compositions. Viscosity reduction was minimal for diluted compositions of about 6% concentration when the brine concentration changed from 0% to 15%. On the other hand, viscosity dropped by about a factor of 1.5 for intermediate polymer concentrations (i.e., 12%) for brine concentrations ranging from 0.0% to 15%. Again the drop in viscosity is due to the dilution effect by the brine. The effect of polymer composition concentration on the viscosity is very significant, as can be seen from Table 8.

TABLE 8

100% Gelation Time and Viscosities of Different Polymer Compositions at different Brine Concentrations upon Aging at 80° C.

| Polymer Composition | Polymer Concen. (wt %) | 100% Gelation Time (hrs.) at 80° C. for different brine % in polymer | | | | Viscosity at 80° C. and 100 s$^{-1}$ for different brine %, (cP) | | | |
|---|---|---|---|---|---|---|---|---|---|
| | | 0% | 5% | 10% | 15% | 0% | 5% | 10% | 15% |
| 1 | 23.00 | 9.75 | 13 | 16.5 | 26.0 | 94.00 | 90.10 | 72.80 | 59.40 |
| 1-1 + 3% AA | 18.00 | 22.00 | — | — | — | 80.00 | 75.00 | 52.04 | 44.05 |
| 1-2 + 2% AA | 10.72 | 24 (25%) | — | — | — | 10.30 | 9.20 | 7.90 | 7.30 |
| 1-3 + 2% AA | 6.02 | 24 (20%) | — | — | — | 4.10 | 4.10 | 4.00 | 4.10 |
| 11 | 32.10 | 7.00 | 10.0 | — | 17.00 | 117.50 | 80.60 | 67.30 | 58.40 |
| 11C | 24.07 | 18.50 | 62 | 62 (60%) | 62 (60%) | 31.70 | 24.80 | 21.40 | 19.70 |
| 11C + 0.11% AA | 24.07 | 4.75 | 6.5 | 48 (60%)+ | 62 (60%) | 68.00 | 39.20 | 27.20 | 22.90 |
| 11C-1 + 3% AA | 17.65 | 25.00 | — | — | — | 17.20 | 16.14 | 14.00 | 13.00 |
| 11C-2 + 2% AA | 10.65 | 24 (25%) | — | — | — | 4.50 | 4.60 | 4.70 | 4.40 |
| 11C-3 + 2% AA | 6.32 | 24 (20%) | — | — | — | 4.70 | 3.90 | 3.40 | 3.50 |
| 12 | 22.68 | 10.00 | 62 | 72 | 72 | 418.50 | 261.90 | 186.70 | 149.70 |
| 12D | 20.18 | 15.00 | 62 | 62 | 62 | 125.90 | 107.40 | 82.60 | 71.00 |
| 12D + 0.11% AA | 20.18 | 4.50 | <89 | <89 | <89 | 667.4* | 260.0* | 218.6* | 178.7* |
| 12D-1 + 3% AA | 18.00 | 22.00 | — | — | — | 404.00 | 150.00 | 125.00 | 94.00 |
| 12D-2 + 2% AA | 9.25 | 24 (25%) | — | — | —' | 9.40 | 8.40 | 7.20 | 6.60 |
| 12D-3 + 2% AA | 6.25 | 24 (25%) | — | — | — | 4.90 | 4.50 | 4.10 | 4.00 |
| 62 (SF + SNF) | 47.00 | 2.50 | 10 | 48 (32%) | — | — | — | — | — |
| 62(2) (SF + SNF) | 51.51 | 48 .(20%) | 62 (8%) | 62 (8%) | 62 (8%) | 14.13 | — | — | — |

Viscosities of solution 12D + 0.11% AA were measured at 60° C.

Example 31

Effect of Cross-Linkers and Concentration on Some Polymer Gel Stability

The effect of cross-linker type and concentration on the gel stability of various polymer compositions was evaluated. The stability of the gels formed by the polymer compositions is a very important property that needs to be achieved. Gel stability is defined here as being a gel that remains elastic and durable, doesn't synerese or produce water, and maintains its original quality and integrity and strength when it is exposed to elevated temperatures. The gels that were produced and discussed above were exposed to further ageing at 80° C. in an air circulating oven. The above characteristics of the gels were observed and recorded as a function of time. The results show that for polymer composition No. 1, all the 100% gels that were produced by cross-linkers of Boric acid and Borax were stable, even after 858 hours of exposure at 90° C. for all the ranges of concentrations studied. Similar behavior was also observed for acetic acid with the concentrations between 0.11% to about 0.66%. However, for concentrations of acetic acid equal to or exceeding 1%, about 10% of water is being produced after 672 hours of exposure at 90° C. For higher concentrations of acetic acid, the production of water increases. Therefore, concentrations of 0.5% or less of acetic acid would give a stable gel with solution No. 1. For polymer compositions No. 2 and No. 3, no stable gels can be maintained at 80° C. for any of the cross-linkers tested. Solution No. 3 has no gel formation, and therefore the study of stability does not apply. As for polymer composition No. 4, the gels formed by both HCl and Sulfonic acid were stable at 80° C., even after exposure of about 766 hours in the case of HCl, and about 514 hours in the case of sulfonic acid. However, both cross-linkers produce brittle gels. Finally, polymer composition No. 5 produces hard, black gels with sulfonic acid cross-linker, and is very stable after exposure at 80° C. for 514 hrs.

Example 32

Effect of Brine on Gel Stability and Strength of Some Polymer Compositions

The effect of brine on the gel stability and strength of various polymer compositions was studied. Tables 9 and 10 show the gel stability and gel strength of three main polymer gels that were prepared in tab water, and in tab water with brine placed on top. All of these gel systems were stored at 80° C. The gels that were prepared in tab water were most stable and didn't synerese, even after they had been aged for about 858 hours at 80° C. They also maintained their strength with no appreciable change. However, when brine was placed on top of these gels, they lost imbedded water of about 40% after 768 hours of aging at 80° C. for composition No. 1, No. 11C+0.11A.A. and 12D+0.11% A.A., as shown in Table 9. On the other hand, for the gels that were prepared in 100% brine (3% KCl), as shown in Table 10, the gel strength is reduced quit significantly compared to the gels prepared, in tab water, as shown in Table 9. The gels that were prepared in tab water with brine replaced on top showed some reduction in strength, but not as significant as it was with gels that were prepared in 100% brine. Another observation is that in the presence of brine, whether it is imbedded as a whole in the gels or is brine that is placed on top, some syneresis took place. However, syneresis was more pronounced in the case of gels prepared in 100% brine.

TABLE 9

Gel Stability and Gel Strength of Concentrated Polymer Compositions Prepared in Tab Water and aged at 80° C.

| Polymer Comp. | Gelation Time (hrs) @ 80° C. | Gel Prepared in 100% Tab Water Only | | | Gel Prepared in Tab Water and Stored With Brine on Top* | | |
|---|---|---|---|---|---|---|---|
| | | Stability | | | Stability | | |
| | | Hrs | $H_2O$ (%) | Gel Strength** | Hrs | $H_2O$ (%) | Gel Strength$ |
| 1 | 9.75 | 858 | 0 | 6 | 768 | 40 | Spongy |
| 11C + 0.11% A.A. | 4.75 | 858 | 0 | 5 | 768 | 40 | Spongy |
| 12D + 0.11% A.A. | 4.50 | 858 | 0 | 7 | 768 | 40 | Spongy |

*The 3% KCl Brine was added on top of the polymer gels
**Gel strength grading is qualitative and it was given numbers from 0-'0, where 0 is water-like and '0 means very strong and elastic gel
$Spongy gels are those gels that lose water upon syneresis

TABLE 10

Gel Stability and Gel Strength of Concentrated Polymer Compositions Prepared in 100% (3% KCl) Brine Upon Aging at 80° C.

| Polymer Comp. | Gel Prepared in 100% Brine | | | Gel Prepared in Brine and Stored at 80° C. With Brine on Top | | |
|---|---|---|---|---|---|---|
| | Stability | | | Stability | | |
| | Hrs | $H_2O$ (%) | Gel Strength | Hrs | $H_2O$ (%) | Gel Strength |
| 1 | 672 | 20 | 4 | 504 | 40 | 4 |
| 11C + 0.11% A.A. | 672 | 52 | 2 | 504 | 55 | 4 |
| 12D + 0.11% A.A. | 672 | 50 | 3 | 504 | 60 | 4 |

The case where polymer gels are prepared in 100% tab water and aged at a temperature of 80° C. with brine (3% KCl) placed on top represents the real case of water shutoff or sand consolidation treatment with these gels. The polymer compositions prepared in 100% tab water will be injected first in the producing oil and/or water formation. These polymer compositions will then transform into gels after a prescribed gel time. The gels that contain almost 100% tab water will face the brine existing in the fluid-producing formation under reservoir conditions. Finally, it was observed that polymer composition No. 1 that was prepared in tab water with brine placed on top gave gel that had delayed syneresis for more than 100 hours, compared to the other two polymers. This polymer gel has no added cross-linker and has a long gelation time compared to the other two polymer gels (9.75 hrs. of gel time compared to about 4.75 and 4.5 hours of gel time for the other two polymer gels at 80° C.).

Table 10 shows the gel stability and gel strength of polymer gels prepared in 100% brine and aged at 80° C. with brine on top of them. Again, these gels were the least stable of all other gels mentioned above. Polymer gel No. 1 syneresed the least, with about 40% of water production after only 504 hours of aging at 80° C., compared to 55% and 60% of water production for polymer gels No. 11C+ 0.11% AA and No. 12D+0.11% AA, respectively.

In summary, polymer gels prepared in 100% tab water are most stable and the strongest gels when aged at 80° C. for extended periods of time. The gels second in stability are those polymer gels prepared in 100% brine and stored at 80° C. The gels ranked third in stability are those gels prepared in 100% tab water and stored at 80° C. with brine on top of them. The gels ranked fourth in stability are those gels prepared in 100% brine and stored at 80° C. with brine placed on top of them. As for polymer gels, the most stable polymer gel is No. 1, followed by 11C+11% AA and 12D+0.11% AA respectively.

Example 33

Gel Strength of Some Polymer Gels

The gel strength of various polymer compositions was determined by static and dynamic techniques. Polymer compositions Nos. 1, 1+0.11% AA, 11C+0.11% AA, and No. 12D+0.11% AA were tested for their strength after gelling. The strength of these gels was measured by using a Testometric mechanical testing machine. The compositions were gelled in a tube with a diameter of about 27 mm. The bottom of the tube is conical and has an orifice that was drilled through, measuring 3 mm in diameter and 1.5 mm in length. The tubes containing the gels were then compressed by applying a plunger facing the gels and the gels were extruded at a constant extrusion rate of 0.5 mm/min. The dynamic shear stress, force, strain, and total deflections were recorded continuously. Table 11 shows the extracted data. These properties include the viscosity and the modulus of elasticity in addition to the force needed to extrude these gels at room temperature through an orifice of 0.3 cm in diameter. The data shows that polymer composition No. 12D+0.11% AA produces the strongest gels compared to the other polymer compositions.

TABLE 11

Visco-elastic Properties of Extruded Gels

| Polymer Comp. | Force* F, (Kg) | Strain* | Deflection* (mm) | Stress** $\sigma_c$ (kg/cm$^2$) | Viscosity $\eta$ (cP) | Modulus of Elasticity E (kg/cm$^2$) | E (psi) |
|---|---|---|---|---|---|---|---|
| 1 | 23.29 | 0.177 | 17.03 | 341.82 | 8.90E+9 | 1942.3 | 2.86E4 |
| 1 + 0.11% AA | 19.51 | 0.202 | 19.36 | 277.02 | 7.50E+9 | 1372.5 | 2.02E4 |
| 11C + 0.11% AA | 15.45 | 0.130 | 12.44 | 223.76 | 5.96E+9 | 1725.9 | 2.54E4 |
| 12D + 0.11% AA | 37.10 | 0.104 | 9.93 | 528.12 | 14.3E+9 | 5101.7 | 7.5E4 |

*At peak in tube
**At peak in capillary

Another experiment was also performed to test the gel strength under static load conditions. The tubes containing the gels were loaded with dead weights and stored at 80° C. Polymer compositions No. 1, 11C+0.11% AA, 12D+0.11% AA, 11C−1+3% AA, 1-1+3% AA and 12D−1+3% A.A were first gelled, and an orifice with diameter of 0.3 cm and length of 0.15 cm was drilled through the bottom of the tube. A dead weight of 3.36 kg was replaced on top of the gels for more than 240 hours at 80° C. No gel came through the orifice for polymer compositions Nos. 1, 11C+0.11% AA, and No. 12D+0.11% AA after 240 hours of storage at 80° C. However, for gels made from 11C−1+3% AA, 80% of the gel did extrude out after only 96 hours of storage at 80° C. under the same dead load of 3.36 kg. Similarly, for polymer composition No. 1-1+3% AA, 20% of the gel extruded out after 96 hrs under a static load of 3.36 kg (or 700 psi) at 80° C. Polymer composition No. 12D−1+3% AA extruded only 8% of the gel under the same conditions. Some of the data and results are shown in Table 12. It should be noted that polymer composition 11C−1+3% AA is a dilute version of polymer composition No. 11C+0.11% AA, where the concentration of the former is about 18%, compared to 23% concentration for the latter. Also polymer compositions No. 1-1+3% AA and polymer composition 12D−1+3% AA are dilute versions of polymer compositions No. 1 and No. 12D, respectively. Table 12 shows the results of this static dead weight test that amounts to about 47.56 kg/cm$^2$ of static stress.

TABLE 12

Gel Strength under Static Dead Weight

| | Polymer Gels (% gel extruded) | | | |
|---|---|---|---|---|
| Time Stored at 80° C. (hrs.) | 1-1 + 3% AA | 11C-1 + 3% AA | 12D-1 + 3% AA | 12D + 0.11% AA |
| 0 | 0.0 | 0.0 | 0.0 | 0.0 |
| 48 | 0.0 | 0.0 | 0.0 | 0.0 |
| 72 | 0.0 | 0.0 | 0.0 | 0.0 |
| 96 | 20.0 | 80.0 | 8.0 | 0.0 |
| 120 | 20.0 | — | 8.0 | 0.0 |
| 144 | 20.0 | — | 8.0 | 0.0 |
| 240 | 20.0 | — | 8.0 | 0.0 |

Example 34

Core Permeability Flooding System

Performance evaluation of some developed polymer compositions as water shut-off treatments was carried out by using Bench Top Permeability Flooding System (BPS-805). The BPS-805 system is a manually operated system designed for performing simple liquid permeability tests at pore pressures up to 1500 psi. The system is equipped with a pump, two transducers to measure the pressure drop, a core holder, and a back pressure regulator. The system is connected to computer software. It mainly consists of a pump capable of delivering fluids at rates ranging from 0.01 cc/min up to 100 cc/min, and with injection pressure up to 3000 psi. It has a Hassler core holder mounted horizontally and can house cores with 1.5 inch diameter and from one to four inches in length under a confining pressure of up to 6000 psi. It is also equipped with high accuracy differential pressure of 5000 psi transducer, and 1500 psi back pressure regulator. The core can be heated with heating tapes, and the temperature is controlled by a digital controller. Fluids can be injected directly through the pump or via a cylindrical holder with piston-like drive and a capacity of 500 cc. A data acquisition system, consisting of software program, plug-in interface card and cables, is also provided to control the pump, monitor differential pressures and temperatures, and log all pertinent data, while simultaneously calculating permeability values that are displayed on a real-time graphical display.

Example 35

Sequences of Fluids in Core Flooding

Core flooding experiments with different fluids were carried out for two cases. The first case is brine-polymer-brine (BPB), and the second case is brine-oil-brine-polymer-brine-oil-brine (BOBPBOB). The tests were conducted on cores of an oil-producing well in West Kuwait (designated as Minagish MN-117 cores), and on Berea sand cores of low and intermediate permeabilities. The cores were routinely analyzed for pertinent data, such as weight, length, diameter, pore volume, porosity, grain density, air permeability and Klinkenberg permeability. The cores were saturated with 3% KCl brine using a pressure saturator, and the saturation was done under 2000 psi. After saturation, the cores were weighed and the pore volumes after saturation were measured to check the saturation percentage. It was found that the cores were 100% saturated with 3% KCl and ready for flooding.

Example 36

Main Properties of Core Flooding Fluids

All fluids were degassed before they were used for the flooding experiments. Pertinent data, such as the density and viscosity of the brine, oil, and the polymers, were measured and fed into the system a priori. Before loading the core, the inlet line to the core was flushed with brine. Then the core was loaded, confining pressure was set to 2000-2500 psi, and back pressure was set to around 600 psi. The core was held at 60° C., 80° C., and 110° C., which are the main test temperatures.

Table 13 shows the physical properties of the three fluids that were used for the core flooding experiments to evaluate the effectiveness of the developed polymer compositions. The three fluids are oil, 3% KCl brine, and the polymer composition No. 1, with and without a cross-linker of acetic acid. Dynamic viscosities at various temperatures ranging from 25° C. to 80° C., along with their densities at 25° C., are shown in the table. The oil used in the evaluation is Habarah TIMA 600R, which is thermally stable oil used at high temperatures as heating oil.

TABLE 13

Fluids used for Water Shut-off Evaluation

| Component | Density at 25° C. (g/cc) | Dynamic Viscosity, (cP) | | | |
|---|---|---|---|---|---|
| | | 25° C. | 40° C. | 60° C. | 80° C. |
| Polymer Composition No. 1 | 1.0676 | 578.05 | 403.92 | 212.87 | 124.13 |
| Polymer Composition No. 1 + 0.22% AA | 1.0659 | 713.18 | 447.64 | 282.69 | 171.75 |
| Oil (Habarah TIMA 600R) | 0.8599 | 48 | 29.24 | 12.60 | 7.00 |
| Brine (3% KCl) | 1.0154 | 0.97 | 0.72 | 0.53 | 0.40 |

Example 37

Rheological Properties of Some Polymer Compositions Used for (WSO)

Table 14 shows the viscosity of some polymer compositions that were used for the performance evaluation as water shut-off (WSO) polymer gels. These viscosities were measured at temperatures ranging from 40° C. to 80° C. The viscosities shown in the table correspond to a shear rate of 100 s$^{-1}$. Also shown in the table are the viscosities that are predicted, from curve fitting equations, at 90° C. and 110° C. The viscosities were measured using a Haake Rotational Viscometer. The viscosities range between 4.8 cP to over 2105 cP when measured at 40° C., and between 3.2 cP to 437.7 cP when measured at 80° C.

TABLE 14

Rheological Properties of Polymers Used for Water Shut Off Evaluation

| Polymer Composition | Acetic Acid Cross-Linker (%) | Polymer Concentration (%) | Measured Viscosity at 100 s$^{-1}$ (cP) | | | Predicted Viscosity (cP) | |
|---|---|---|---|---|---|---|---|
| | | | 40° C. | 60° C. | 80° C. | 90° C. | 110° C. |
| 1 | 0.0 | 23.0 | 287.7 | 147.2 | 94 | 88.1 | 47.3 |
| 1-1 | 0.0 | 17.95 | 130.2 | 73.4 | 44.0 | 37.8 | 27.2 |
| | 2.0 | | 96.8 | 64.83 | 42.76 | 39.96 | — |
| | 3.0 | | 104.4 | 66.56 | 56.30 | 41.00 | — |
| 1-2 | 0.0 | 10.72 | 26.2 | 15.6 | 10.3 | 8.9 | 6.7 |
| 1-3 | 0.0 | 6.04 | 6 | 4.6 | 4.1 | 3.9 | 3.7 |
| 11 | 0.0 | 32.0 | 340 | 152.5 | 117.75 | 97.3 | 81.2 |
| 11C | 0.0 | 24.0 | 42 | 32 | 24 | 19.2 | 16.6 |
| | 0.05 | | 88.8 | 47.6 | 36.20 | 27.9 | 21.3 |
| | 0.11 | | 73.67 | 42.90 | 30.76 | 25.67 | — |
| 11C-1 | 0.0 | 17.65 | 22.5 | 14.22 | 10.10 | 9.10 | — |
| | 2.0 | | 24.6 | 15.7 | 12.60 | 11.80 | — |
| | 3.0 | | 25.0 | 17.0 | .15.2 | — | — |
| 11C-2 | 0.0 | 10.65 | 7.4 | 5.5 | 4.5 | 3.9 | 3.3 |
| 11C-3 | 0.0 | 6.32 | 4.8 | 3.9 | 3.2 | 3.4 | 3.2 |
| 12 | 0.0 | 22.68 | 2105 | 1089 | 418.5 | 339.9 | 163.44 |
| 12D | 0.0 | 20.2 | 800.6 | 252.8 | 97 | 87.8 | 30.37 |
| | 0.11 | | 1044 | 335.7 | 170.3 | — | — |
| 12D-1 | 0.0 | 18.25 | 672.4 | 221.9 | 88.6 | 45.7 | 15.6 |
| | 2.0 | | — | — | — | — | — |
| | 3.0 | | 800 | 458 | 404 | — | — |
| 12D-2 | 0.0 | 9.24 | 35.2 | 15.8 | 9.4 | 7.4 | 5.1 |
| 12D-3 | 0.0 | 6.25 | 9.8 | 6.5 | 4.9 | 4.4 | 3.6 |

Example 38

Results of Performance Evaluation of Some Polymer Gels

The results that were obtained from the evaluation of some of the developed polymer compositions utilizing the (BPS-805) system are outlined below. The polymer compositions that were chosen for the evaluation are concentrated polymer compositions No. 1, No. 1+0.22% AA, No. 11, No. 11C+0.11% AA, No. 12, No. 12D+0.11% AA, and 12+0.05% AA, and the dilute forms of No. 1, No. 11C+0.11% AA and No. 12D+0.11% AA. The main characteristics of these polymer compositions, such as density, dynamic viscosity at various temperatures, 100% gelation time with and without a cross-linker, their gel elasticity at various test temperatures ranging from 60° C.-110° C., their gel elasticity characteristics upon aging at 80° C., and their stability were disclosed above. Two core flooding cases were studied in the evaluation. The first case assumes a formation that produces only water. Hence, a flooding sequence of brine-polymer-brine (BPB) was carried out for Minagish MN-117 cores of intermediate permeability (1020 mD-3320 mD) and for Berea sand cores of low permeability (68 mD-126 mD) and of intermediate permeability (1700 mD-2700 mD). The second core flooding case assumes that a formation produces both oil and brine. Hence, a sequence of injection of brine-oil-brine-polymer-brine-oil-brine (BOBPBOB) was conducted for a number of cores. This second case was repeated for different polymer pore volumes, followed by several cycles of reverse flooding. For example, a fluid injection sequence of brine-oil-brine-polymer-brine-oil-brine-polymer-brine-oil-brine-polytner-brine-oil (BOB-P-BOB-P-BOB-P-BO) was carried out in both the forward direction and the reverse direction. Each cycle consists of 30 minutes for brine flooding, followed by 30 minutes of oil flooding, for a total flooding time of 1 hour for each cycle.

As for Minagish MN-117 cores, the first case of core flooding (BPB) was carried out. Brine was flooded at a rate of 20 cc/min, and 178.65 pore volumes of brine were injected until stabilization was reached. The measured permeability to brine was 1231.47 mD and differential pressure was 1.05 psi. Polymer composition No. 1+0.22% AA was then injected at a rate of 10 cc/min to cover 0.7 pore volume of the core, and then the core was shut-in for about 22 hours at 70° C. After 22 hours of shut-in at 70° C. permeability to brine dropped to 123.74 mD and differential pressure was 4.49 psi, Directly after flooding with brine, 1.31 pore volume of the polymer was injected again at a rate of 2 cc/min. Then the core was shut-in for about 22 hours at 70° C. Brine was then injected at a rate of 10 cc/min; a total of 64.90 pore volumes were injected. Permeability to brine dropped to 12.38 mD, and the differential pressure was 41.39 psi. A 1.92 pore volume of the polymer was then injected at a rate of 2 cc/min. Then the core was shut-in for about 22 hours at 70° C. Brine was injected at a rate of 10 cc/min and continued till the pressure build-up reached 3000 psi, which is the maximum pressure of the pump, and no fluid was coming out from the core, which indicates that a total water shutoff was achieved. Permeability reduction to brine, which is defined as $(K_{ab}-K_{wi})/K_{ab}$, was calculated to be 89.95% for 0.7 polymer pore volume injected and 98.99% for 1.31 polymer pore volume injected, and finally, 100% permeability reduction to brine or a total water shut-off was achieved for a polymer pore volume of 1.92 when tested at 70° C. and for the first case of flooding (BPB).

For the second case, where brine, oil and polymer (BOB-PBQ) were injected in the MN-117 core with initial permeability to brine of 1165 mD, again almost a 100% water shutoff was achieved at 1.0 pore volume of polymer no. 1+0.11% AA, and about 96% of permeability reduction to oil was achieved when tested at 70° C. After the core was treated with the polymer no. 1+0.22% AA in the presence of irreducible water and residual oil, the forward flooding and reverse flooding of oil show no difference in the permeability reduction to oil.

When a MN-117 core with initial absolute permeability to brine of 531.5 mD is saturated with irreducible brine and residual oil treated with subsequent pore volumes of polymer composition No. 1+0.22% AA, the permeability reduction to brine is almost 80% for brine and about 3.0% reduction for oil when only about 0.2 PV of polymer was injected and tested at 70° C. Also, at 0.45 PV of polymer no. 1+0.22% AA treatment, the permeability reduction to brine is about 96%, while for oil, it is about 30%.

Example 39

Effect of EAC Pre-Flushing with (BPB) Flooding Sequence

Pre-flushing the Berea sand cores (1700 mD-2700 mD) with ethyl acetate (EAC) prior to polymer treatment in the first case of flooding sequence (BPB) doesn't improve the degree of water shutoff, and it weakens the treatment so that the pressure breakthrough is half that of the case where there is no pre-flush and the end permeability is higher, indicating less water shutoff. Pre-flushing the Berea sand core with EAC prior to injecting 0.66 PV of concentrated polymer composition No. 1+0.22% AA results in final permeability to brine, breakthrough pressure and residual resistance factor of 0.12 mD, 530 psi, and 9883, respectively, compared to the no pre-flush case where only 0.39 PV of polymer no. 1+0.22% AA was injected, where the corresponding values were 0.048 mD, 1000 psi, and 24,708, respectively, when tested at 80° C. The same trend of chemical pre-flush with EAC was also observed when polymer solutions No. 11 and No. 12 were used at almost the same dose of treatment for Berea sand cores with intermediate permeability, and when all were tested at 80° C. for the first case of flooding sequence (BPB).

Example 40

Effect of EAC Pre-Flushing with (BOBPBO-) Flooding Sequence

For the second case, where brine and oil were used as core flooding media (BOBPBO-), the effect of EAC pre-flush prior to polymer treatment of Berea sand cores (1700 mD-2700 mD) tends to give more permeable cores and less water shutoff, where the final % permeability reduction to brine and to oil after 8 cycles of reverse flooding for treated cores with about 0.48 PV of concentrated polymer compositions and tested at 80° C. were: 84.64% and 27.52%, respectively, for polymer composition No. 1, and they were 70.96% and 18.07%, respectively, for polymer composition No. 11C+0.11% AA, and they were 78.35% and 38.72%, respectively, for polymer composition No. 12D+0.11% AA. On the other hand, almost a total water shutoff was achieved when there was no chemical pre-flush prior to the same dose of polymer treatment. It is possible that the presence of EAC with polymer compositions delays the gelation time of these compositions, where for polymer solution no. 1, the gelation time increased from 4.5 hours to 14.0 hours when EAC was present in the polymer solution and tested at 80° C. Therefore, more shut-in time should be allowed for gelation to take place whenever EAC is present.

Example 41

Effect of Polymer Concentration on their Gel Performance

The effect of the polymer composition concentration on their performance was also tested. Therefore, core flooding tests were conducted on both the concentrated and the diluted polymer compositions for two cases of flooding, namely, for Case (1) Brine-polymer-Brine (BPB), and for Case (2) Brine-oil-brine-polymer-brine-oil (BOBPBO-), at three temperatures of 60° C., 80° C. and 110° C., with and without chemical pre-flush using MN-117 cores with permeabilities that range from 1020 mD to 3320 mD and Berea sand cores of low permeability (69 mD-126 mD) and intermediate permeability (1700 mD-2700 mD).

When concentrated polymer compositions No. 1, No. 11C+0.11% AA, and no. 12D+0.11% AA were used to treat Berea sand cores (1700 mD-2700 mD) with about 0.5 PV of the composition, these polymers gave a high rate of oil recovery and very high permeability to oil, while all of them gave a very low rate of water recovery and very low permeability to brine after nine reverse flooding cycles at 80° C. For example, the final permeability reduction to brine was 78.64%, compared to only 11.75% permeability reduction to oil when polymer composition #12D+0.11% AA at 0.5 PV treatment was used at 80° C. When the diluted version of these polymer compositions was used to treat the same permeability Berea sand cores with 1.0 PV of these polymers, the % permeability recovery to brine at 80° C. was 4.51%, 9.26% and 20.48%, respectively, for polymer compositions no. 1-1+3% AA, no. 11C-1+3% AA, and no. 12D-1+3% AA, respectively. Similarly, the % permeability recovery to oil was 44.95%, 73.44%, and 91.95%, respectively, for the same polymers, indicating that about 1.0 PV of diluted polymers is as effective as 0.5 PV of the concentrated version of these polymers. Similar behavior was also observed when both the concentrated and diluted polymer compositions were tested at 60° C., where 0.50 PV of the diluted solutions is equivalent to 0.25 PV or less of the concentrated polymer compositions.

Concentrated polymer composition no. 11C+0.11% AA was used to treat low permeability Berea sand core (69 mD-126 mD) with 0.387 PV treatment, which gave almost the same degree of water shut off of 96.34%, and the permeability to oil was 78.14%, when tested at 80° C.

Example 42

Effect of Sequential Treatment with Diluted and Concentrated Polymer Compositions on their Performance The effect of combined sequential injection of diluted and concentrated polymers for water shutoff was also tested. A combined sequential injection or treatment of diluted polymer compositions with their concentrated counterparts produces effective water shut-off treatment when they were tested for the second case of core flooding (BOBPBO) at 110° C. For example, 0.75 PV of concentrated polymer No. 1 treatment gave almost the same effect as the second treatment that consisted of 0.5 PV of its diluted version (polymer No. 1-1+3% AA) plus 0.25 PV of its concentrated form (polymer No. 1), where % reduction to brine permeability ranged from 78.8% to 84.62%, while for oil the % reduction was 24.22% to 29.73% for the two treatments, respectively. A similar trend was also found to be true when concentrated and diluted polymers were used in the brine-polymer-brine (BPB) case, where 0.5 PV of concentrated polymer treatment is equivalent to almost 1.0 PV of diluted polymer compositions treatment when tested at 80° C. with Berea sand cores, where the % permeability reduction to brine ranged from 91%-99% for the concentrated polymers, compared to a range of 64%-87% for the diluted versions.

Example 43

Effect of Shut-in Conditions of Some Polymer Gels on their Performance

Shut-in times and conditions of shut-in do affect the performance of both the diluted and concentrated polymer compositions performance as water shut-off treatments. Shut-in times should be at least two to three times the laboratory-measured gelation time, and the conditions of shut-in should be similar to reservoir conditions (i.e., similar pressure and temperature). For example, when 0.26 PV of polymer composition No. 1 was injected into Berea sand core at 80° C., the core was shut-in for 17 hours at 60° C. and 1500 psi, followed by another 24 hours at 80° C. at atmospheric pressure, so that the brine and oil % permeability reduction was 98.8% and 87.78%, respectively, compared to the same treatment by the second shut-in condition that was 41 hours at 60° C. and at 1500 psi only, so that the corresponding % permeability reduction to brine and oil were 98.29% and 73.85%, respectively. Similar behavior was also observed for other diluted and concentrated polymer compositions. For example when 1.05 PV of diluted polymer composition No. 1-1+3% AA was injected and the treated Berea core was shut-in at 80° C. for 17 hours and 1500 psi, followed by 24 hrs. at the same temperature and at atmospheric pressure, the resulting % permeability reduction to brine and oil were 97.22% and 83.91%, respectively, compared to the second case of shut-in, where the core was kept at 80° C. and 1500 psi for 41 hrs, which gave % permeability reduction to brine and oil of 95.49% and 55.05%, respectively.

Example 44

Effect of Thermal Ageing on the Performance of Polymer Gels

The effect of thermal aging conditions on the performance of concentrated and diluted polymer compositions on the water shut-off of treated Berea sand cores was investigated. Low permeability Berea sand cores (69-126 mD) were treated with. 0.25 PV of concentrated polymer compositions No. 1, No. 11C+0.11% AA, and 12D+0.11% AA at 80° C. The treated cores were tested for the % permeability recovery to oil and brine after they have been aged for more than 4 months in oil that was kept at 80° C. and under a pressure of 700 psi. The results show that no appreciable change in their performance as water shut-off gels took place. For example, for the three polymers tested, % permeability recovery to brine changed from about 1.14% to 4.00% for polymer No. 1 after 150 days of aging. Similarly, for polymer No. 11C+0.11% AA, the % recovery to brine changed from 0.32% to 6.67% after 144 days of aging. Finally, for polymer No. 12D+0.11% AA, the % permeability recovery to brine changed from 0.97% to 6.25% after 128 days of aging. The same trend was also observed for % permeability recovery to oil. For example, aging of Berea sand core samples treated with 1.0 PV of the diluted version of the above concentrated polymer compositions (i.e., 1-1+3% AA, No. 11C-1+3% AA, and No. 12D-1+3% AA) and aged at the same conditions as above and tested at 80° C. have shown significant changes in % permeability recovery to oil where it was above 90%, while maintaining % permeability recovery to brine of about 20% when tested at 80° C. Finally, the effect of aging was evaluated at 110° C., and the results show that for treated Berea sand cores with 0.75 PV of concentrated polymer compositions (polymer No. 1, No. 11C+0.22% AA, and no. 12D+0.22% AA) and that were aged for 35 days at 80° C. and 700 psi and fully immersed in oil, the % permeability recovery for brine increased from 20% to about 30%, and % permeability recovery for oil approaches about 100% when tested at 110° C. for all the polymer compositions.

Example 45

Effect of Formation Composition on Performance of the Polymer Gels

The effect of formation composition and makeup on the performance of both the diluted No. 11C-1+3% AA and concentrated No. 11C+0.11% AA polymer composition samples were evaluated. Low permeability cores of Berea sandstone (67 mD) and Limestone (45 mD) taken from Sabrieh Oil Field-Northern Kuwait were flooded with different pore volumes of the two polymer compositions at 80° C., and with the second case of flooding sequence where oil and brine were used (BOBPBO). The results in Table 15 show the effect of different pore volumes (PV) on the % permeability reduction of brine and oil. The results show that diluted polymer compositions are more suited to be used with a low permeability formation, regardless of its makeup and composition. This is true because diluted polymers give significant permeability reduction to water with insignificant permeability reduction to oil. Also, the results show that both sandstone and limestone behave the same way with the two polymer systems.

TABLE 15

Effect of pore volume (PV) of polymer compositions on the % permeability reduction of low permeability Berea Sandstone (67 mD) and Limestone (45 mD) cores

| | | Berea Sandstone (67 mD) | | Limestone (45 mD) | |
|---|---|---|---|---|---|
| Polymer Sample | PV Injected | Brine (% $K_w$) | Oil (% Ko) | Brine (% Kw) | Oil (% Ko) |
| 11C + | 0.10 | 72.86 | 50.00 | 73.53 | 38.89 |
| 0.11% AA | 0.15 | 88.00 | 66.00 | 78.65 | 46.51 |
| Conc. = 23% | 0.20 | 96.89 | 77.63 | 91.76 | 65.56 |
| | 0.25 | 99.69 | 94.79 | 98.65 | 88.95 |
| 11C-1 + | 0.10 | 53.0 | 13.00 | 52.00 | 5.00 |
| 3% AA | 0.15 | 72.5 | 19.32 | 70.27 | 7.89 |
| Conc. = 18% | 0.20 | 80.0 | 23.00 | 75.00 | 11.00 |
| | 0.25 | 81.0 | 28.00 | 76.00 | 16.50 |
| | 0.30 | 82.5 | 30.68 | 77.70 | 18.47 |

The polymer gel as described herein is applicable in retarding fluid flow of water from subterranean oil and gas reservoirs and in treating high permeability zones that produce this water. These cases include, but are not limited to, natural and man-made fractures, channeling, shale streaks, fingering, water coning, micro-cracks, and others. The new polymer gelants/gels can be used for both fractured and matrix of oil and gas wells in subterranean formation of sandstone and limestone. By using these polymer compositions that can transform from solutions to gelants to gels, a total water shutoff is possible after a predetermined period of gelation time, selecting predetermined gel properties depending on the needs of the formation zone to be treated. These gels do not enter low permeability zones, which leads to insignificant effect on the productivity of the oil and gas. Therefore, the polymer composition can be used as a water shut-off polymer gel or as a blocking agent, and can also be used as a relative permeability modifier for all types of subterranean formations, including sandstone formations and carbonate or limestone formations.

It is to be understood that the present invention is not limited to the embodiments described above, but encompasses any and all embodiments within the scope of the following claims.

I claim:

1. A gelling agent for water shut-off in oil and gas wells, comprising:
   a water soluble polymer selected from the group consisting of polyvinyl alcohol, a polyvinyl alcohol copolymer and mixtures thereof;
   an amino aldehyde oligomer selected from the group consisting of urea formaldehyde and melamine formaldehyde;
   at least one gelation retarder selected from the group consisting of lignosulfonates and ethyl acetate;
   a cross-linking agent selected from the group consisting of boric acid, acetic acid, borax, ammonium chloride, ammonium sulfate, glyoxal, and glutardialdehyde;
   and an aqueous solvent, the water soluble polymer and the amino aldehyde oligomer being mixed in the aqueous solvent to form a polymer solution, the water soluble polymer being between 10% and 50% by weight of the polymer solution, and the amino aldehyde oligomer being between 50% and 90% by weight of the polymer solution.

2. The gelling agent according to claim 1, wherein the aqueous solvent is selected from the group consisting of deionized water, brine, sea water, and tap water.

3. The gelling agent according to claim 1, further comprising at least one gelation accelerator selected from the group consisting of sulfonated melamine formaldehyde and sulfonated naphthalene formaldehyde.

4. A gelling agent for water shut-off in oil and gas wells, comprising:
   a water soluble polymer selected from the group consisting of polyvinyl alcohol, a polyvinyl alcohol copolymer and mixtures thereof;
   an amino aldehyde oligomer selected from the group consisting of urea formaldehyde and melamine formaldehyde;
   at least one gelation accelerator selected from the group consisting of sulfonated melamine formaldehyde and sulfonated naphthalene formaldehyde;
   a cross-linking agent selected from the group consisting of boric acid, acetic acid, borax, ammonium chloride, ammonium sulfate, glyoxal, and glutardialdehyde; and
   an aqueous solvent, the water soluble polymer and the amino aldehyde oligomer being mixed in the aqueous solvent to form a polymer solution, the water soluble polymer being between 10% and 50% by weight of the polymer solution, and the amino aldehyde oligomer being between 50% and 90% by weight of the polymer solution.

5. The gelling agent according to claim 4, wherein the aqueous solvent is selected from the group consisting of deionized water, brine, sea water, and tap water.

6. A gelling agent for water shut-off in oil and gas wells, comprising:
   10% to 50% by weight of polyvinyl alcohol;
   50% to 90% by weight of urea formaldehyde;
   0.0125% to 0.05% by weight acetic acid; and
   an aqueous solvent.

7. The gelling agent of claim 6, further comprising Ethyl Acetate.

8. The gelling agent of claim 6, further comprising 5% to 20% by weight of sulfonated melamine formaldehyde.

* * * * *